United States Patent [19]

Krug et al.

[11] 4,228,600
[45] Oct. 21, 1980

[54] SHOE BOTTOM

[75] Inventors: Hans-Dietrich Krug, Heidelberg; Willi Mildenberger, Weinheim, both of Fed. Rep. of Germany

[73] Assignee: Firma Carl Freudenberg, Weinheim, Fed. Rep. of Germany

[21] Appl. No.: 9,714

[22] Filed: Feb. 5, 1979

[30] Foreign Application Priority Data

Mar. 9, 1978 [DE] Fed. Rep. of Germany ... 7807113[U]

[51] Int. Cl.² ............... A43B 13/04; A43B 13/12
[52] U.S. Cl. ................. 36/32 R; 36/30 R; 428/315
[58] Field of Search ............ 36/32 R, 30 R, 44; 428/315

[56] References Cited

U.S. PATENT DOCUMENTS

| 3,972,135 | 8/1976 | Pietraszer | 36/30 R |
| 4,002,792 | 1/1977 | Petersen et al. | 428/315 X |
| 4,017,656 | 4/1977 | Lasman et al. | 428/315 X |
| 4,130,948 | 12/1978 | Krug | 428/315 X |

FOREIGN PATENT DOCUMENTS

| 755915 | 2/1971 | Belgium | 36/32 R |
| 2159610 | 6/1973 | Fed. Rep. of Germany | 36/32 R |
| 2365305 | 4/1978 | France | 36/32 R |
| 937755 | 9/1963 | United Kingdom | 428/315 |
| 1126535 | 9/1968 | United Kingdom | 36/32 R |
| 1145809 | 3/1969 | United Kingdom | 36/32 R |

Primary Examiner—James Kee Chi
Attorney, Agent, or Firm—Sprung, Felfe, Horn, Lynch & Kramer

[57] ABSTRACT

A shoe bottom comprising a flexible foam having at least one surface with open or opened cells, and a film of an elastomeric material covering the open or opened cells of said surface. Advantageously the foam is an initially flexible closed-cell crosslinked polyolefin foam and the film is an elastomeric polyurethane of a thickness of about 0.1 to 0.3 mm.

2 Claims, 1 Drawing Figure

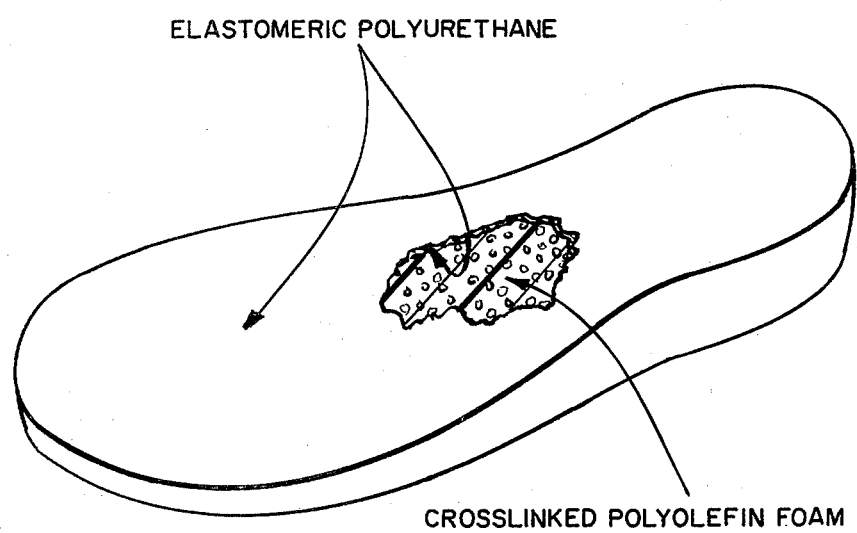

SHOE BOTTOM

The invention relates to a shoe bottom made of a flexible foam and having at least one surface with open or opened cells.

Shoe bottoms are known which are made individually from open- or closed-cell flexible polyurethane or polyolefin foams. A separate mold is needed for making each model. The cost of manufacture therefore is rather high.

It has long been known to machine polyurethane or polyolefin foams. In particular, a corresponding method is known for the manufacture of shoe bottoms which are of relatively simple design and are needed in small quantities. However, shoe bottoms manufactured in this way have not been usable up to now.

Through the cutting operation during the machining of flexible closed-cell foams, the cells near the surface are opened. The strength properties of the surface layer, which statically are particularly important, are affected thereby in a most adverse manner.

In the case of open-cell polyurethane foams, such machining destroys the casting skin originally present. Flexible foams then lose all stability and are unfit for use as shoe bottoms.

The invention has as its object to develop from a flexible foam a shoe bottom which, despite prior machining, exhibits good mechanical properties.

In accordance with the invention, this object is accomplished by applying a film of elastomeric material over the entire surface on which open or opened cells are present.

In one particular embodiment, the film is applied as a coating directly to the surface. In another advantageous embodiment, the film, in the case of a flexible foam consisting of a closed-cell, crosslinked polyolefin foam, is formed of an elastomeric polyurethane. A thickness which has proved particularly advantageous is about 0.1 to 0.3 mm.

The surfaces of the shoe bottom in accordance with the invention are closed throughout. Through the compact structure of the film disposed on the surface, the static properties particularly of the edge portions are substantially improved. Surprisingly, excellent properties can be obtained even with a film of the thickness described.

It has unexpectedly been found that a thicker film is extremely difficult to anchor to flexible foams having an average cell diameter of about 0.3 to 0.9 mm. With a film thickness of about 0.7 mm, for example, the churning stresses which in the case of a shoe bottom cannot be avoided in use will result in delamination or flaking of the film even after limited wear.

In accordance with the invention, this drawback is completely eliminated. Even with extreme mechanical stresses, as when the shoe bottom is used in athletic shoes, the surface layer will not delaminate.

A further advantage is that the mechanical resistance to damage is greatly improved. The resistance to soiling is considerably increased and the penetration of water is rendered more difficult.

The superficial surface covering of the cut edge portions in accordance with the invention has proved advantageous also in view of the possibilities for stylish design which it offers. For example, any desired surface coverings may be laminated directly onto it, which in the case of untreated surfaces often gives rise to problems. Further advantages will accrue if the film itself is colored.

Dyeing with colors differing from the natural colors of the flexible foam is readily possible.

The accompanying drawing is a perspective view of one embodiment of a shoe bottom in accordance with the invention. It consists of a blank of closed-cell, crosslinked polyolefin foam having a bulk density of 70 $kg/m^3$ cut out of a closed slab. The cut surfaces were then covered with a film of elastomeric polyurethane. The average film thickness is 0.2 mm.

The finished shoe bottom has good mechanical properties. It can be used with all known production techniques for shoes.

It will be appreciated that the instant specification and examples are set forth by way of illustration and not limitation, and that various modifications and changes may be made without departing from the spirit and scope of the present invention.

What is claimed is:

1. A shoe bottom consisting of a closed-cell crosslinked polyolefin foam having at least one surface with opened cells, the closed cells of the foam layer having a diameter of about 0.3 to 0.9 mm, and a film of an elastomeric polyurethane of about 0.1 to 0.3 mm thickness adhered to said opened cell surface.

2. A shoe bottom according to claim 1, wherein the film is applied to the surface as a coating.

* * * * *